United States Patent [19]

Shinkai et al.

[11] 4,160,072
[45] Jul. 3, 1979

[54] FOAMABLE AND CROSSLINKABLE POLYETHYLENE COMPOSITION, PROCESS FOR ITS PRODUCTION, AND PROCESS FOR PRODUCING CROSSLINKED POLYETHYLENE FOAMS USING SAID COMPOSITION

[75] Inventors: Ken Shinkai, Hirakata; Norio Chiba, Mukou; Yutaka Ozaki, Mishima, all of Japan

[73] Assignee: Sekisui Kagaku Kogyo Kabushiki Kaisha, Osaka, Japan

[21] Appl. No.: 846,845

[22] Filed: Oct. 31, 1977

Related U.S. Application Data

[63] Continuation of Ser. No. 668,251, Mar. 18, 1976.

[30] Foreign Application Priority Data

Mar. 20, 1975 [JP] Japan .................................. 50-33763

[51] Int. Cl.$^2$ ............................................. C08J 9/10
[52] U.S. Cl. ....................................... 521/86; 521/93; 521/95; 521/96; 521/97; 521/143; 521/154; 521/909; 525/288
[58] Field of Search ...................... 260/2.5 HA, 2.5 E; 521/86, 143, 154; 526/22, 28

[56] References Cited

U.S. PATENT DOCUMENTS

| | | | |
|---|---|---|---|
| 3,017,371 | 1/1962 | Hobenberg et al. .............. | 260/2.5 E |
| 3,340,209 | 9/1967 | Riley, Jr. et al. ............. | 264/DIG. 5 |
| 3,608,006 | 9/1971 | Hosoda et al. ................ | 260/2.5 HA |
| 3,651,183 | 3/1972 | Hosoda et al. ................ | 260/2.5 HA |
| 3,658,730 | 4/1972 | Takahoshi et al. ............ | 264/DIG. 5 |

FOREIGN PATENT DOCUMENTS

| | | | |
|---|---|---|---|
| 1286460 | 8/1972 | United Kingdom ................... | 260/94.9 |
| 1408154 | 10/1975 | United Kingdom ..................... | 521/86 |

OTHER PUBLICATIONS

"Plastics Progress 1955" p. 69, edited by Philip Morgan—British Plastics Convention 1955.
"Celogen—AZ" by R. R. Barnhard, Compounding Research Report No. 38, pp. 1–11.

*Primary Examiner*—Morton Foelak
*Attorney, Agent, or Firm*—Sherman & Shalloway

[57] ABSTRACT

A foamable and crosslinkable polyethylene composition comprising
(a) modified polyethylene obtained by chemically bonding a silane compound containing at least one unsaturated group to polyethylene in the presence of a radical generator,
(b) a zinc salt of a higher carboxylic acid, and
(c) a heat-decomposable blowing agent, and ingredients (a), (b) and (c) having been melt-kneaded with one another at a temperature lower than the decomposition temperature of the heat-decomposable blowing agent.

31 Claims, No Drawings

FOAMABLE AND CROSSLINKABLE POLYETHYLENE COMPOSITION, PROCESS FOR ITS PRODUCTION, AND PROCESS FOR PRODUCING CROSSLINKED POLYETHYLENE FOAMS USING SAID COMPOSITION

This is a continuation of application Ser. No. 668,251, filed Mar. 18, 1976.

This invention relates to a foamable and crosslinkable polyethylene composition, and more specifically, to a foamable and crosslinkable polyethylene composition, a process for its production, and a crosslinked polyethylene foam using the above composition.

A number of techniques for preparing crosslinked polyethylene foams from polyethylene have heretofore been suggested. For example, Japanese Patent Publication No. 6278/66 discloses a process which comprises applying ionizing radiation to a sheet prepared from polyethylene containing a heat-decomposable blowing agent, and heating the resulting crosslinked polyethylene sheet at atmospheric pressure to expand it. Furthermore, Japanese Patent Publication No. 17436/64 suggests a process which comprises mixing polyethylene with an organic peroxide (chemical crosslinking agent) and a blowing agent, heating the mixture to crosslink it, and foaming it at atmospheric pressure.

The suggested processes are called "general atmospheric pressure foaming method", and are utilized commercially for the production of polyethylene foams. In radiation-initiated crosslinking and foaming techniques typified by the process of Japanese Patent Publication No. 6278/66 cited above, electron beams are usually the only source of commercially available radiation. Since electron beams have a weak penetrating power, their effect does not extend to the inside of a polyethylene sheet having a large thickness. The utilization of the radiation-initiated crosslinking and foaming techniques is therefore limited to sheets having a thickness of about 10 mm at most. On the other hand, the process of Japanese Patent Publication No. 17436/64 using chemical crosslinking agents suffers from the defect that crosslinking tends to begin at the time of melt-kneading polyethylene containing a chemical crosslinking agent, and this makes its subsequent molding difficult. Furthermore, since crosslinking and foaming proceed almost simultaneously in this process, it is difficult to maintain the form of a molded article which is being crosslinked and foamed. Another defect is that because there is a difference in the degree of crosslinking reaction between the surface layer and the inside layer, the resulting foamed article is non-uniform with different cell diameters between the surface layer and the inside layer. This tendency becomes greater when it is desired to obtain foamed articles of larger thickness. With the latter method, it is also difficult to obtain foamed article having a fine cellular structure.

In an attempt to remedy these defects, Japanese Laid-Open Patent Publications Nos. 100470/73 and 130460/74 suggest a process which comprises chemically bonding a silane compound containing at least one unsaturated bond to polyethylene in the presence of a radical generator to form silyl-modified polyethylene, and heating the silyl-modified polyethylene together with a silanol condensation catalyst and a heat-decomposable blowing agent such as azodicarbonamide to a temperature above the decomposition temperature of the blowing agent, thereby to expand and crosslink the modified polyethylene. This process can remove the above-mentioned defects to a somewhat satisfactory extent, but has the serious defect that when an organometallic compound such as dibutyltin dilaurate disclosed specifically as the silanol condensation catalyst in the above cited Patent Publication is used, the polyethylene composition prior to heat-foaming has poor storage stability, and when it is heat-foamed after storage for a long period of time for reasons of transportation or otherwise, it is impossible to obtain a foamed article having the desired expansion ratio because the gel content of the composition becomes extraordinarily high by the influence of the moisture in the air and by the action of the catalyst.

It has now been found that when a zinc salt of a higher carboxylic acid not disclosed in the Japanese Laid-Open Patent Publications cited above is used as the silanol condensation catalyst in the process of these Publications, polyethylene compositions which have very good storage stability prior to heat-foaming can be obtained.

Accordingly, it is an object of this invention to provide a foamable and crosslinkable polyethylene composition which has superior storage stability, can be expanded uniformly throughout, and can be shaped into a foamed article of large thickness.

Another object of this invention is to provide a process for producing the above foamable and crosslinkable polyethylene composition.

Still another object of this invention is to provide a process for preparing a crosslinked polyethylene foam from the above foamable and crosslinkable polyethylene composition.

Other objects and advantages of the present invention will become apparent from the following detailed description.

According to the present invention, there is provided a foamable and crosslinkable polyethylene composition comprising (a) modified polyethylene obtained by chemically bonding a silane compound containing at least one unsaturated group to polyethylene in the presence of a radical generator, (b) a zinc salt of a higher carboxylic acid, and (c) a heat-decomposable blowing agent, said ingredients (a), (b) and (c) having been melt-kneaded with one another at a temperature lower than the decomposition temperature of the heat-decomposable blowing agent.

The term "polyethylene", used in the present specification and appended claims, is meant to include not only a homopolymer of ethylene, but also an ethylene copolymer composed of at least 50 mole%, preferably at least 70 mole%, of an ethylene unit and a minor proportion of a monomer copolymerizable with ethylene, and a blend of at least 50% by weight, preferably at least 60% by weight, of the ethylene homopolymer or copolymer with another polymer.

Examples of monomers copolymerizable with ethylene are vinyl acetate, propylene, butene and hexane. The other polymer that can be blended with the ethylene homopolymer or copolymer may be any type of polymer compatible with it. Examples are polypropylene, polybutadiene, polyisoprene, polychloroprene, chlorinated polyethylene, a styrene/butadiene copolymer, a vinyl acetate/ethylene copolymer, chlorinated polyethylene, and a vinyl chloride/vinyl acetate copolymer. Especially preferred species are polypropylene, polybutadiene and styrene/butadiene copolymer.

Examples of polyethylene that can be advantageously employed in the present invention are low-, medium- and high-density polyethylene, an ethylene/vinyl acetate copolymer, an ethylene/propylene copolymer, a blend of polyethylene and polypropylene, a blend of polyethylene and an ethylene/vinyl acetate copolymer, and a blend of polyethylene and an ethylene/propylene copolymer. Of these, the medium density polyethylene, low density polyethylene, and ethylene/propylene copolymer are especially suitable.

Preferably, the polyethylene resins have a softening point of less than 130° C. Furthermore, it is preferred that the polyethylene resins have a melt index of 2.0 to 20, a number average molecular weight of 20,000 to 60,000, an intrinsic viscosity, at 75° C. in xylene, of 0.8 to 1.1, and a density of 0.910 to 0.940.

According to the present invention, the polyethylene described above is converted to modified polyethylene by chemically bonding a silane compound containing at least one unsaturated group to it in the presence of a radical generator.

The silane compound used in this invention is an organosilicon compound containing at least one unsaturated group capable of being chemically bonded to the sites of free radicals generated in the polymer chain of the polyethylene as a result of radical reaction, and typically includes organosilane compounds of the following formula

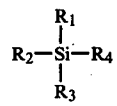

(I)

wherein one or two, preferably only one, of $R_1$, $R_2$, $R_3$ and $R_4$ represent a hydrocarbon or hydrocarboxy group containing a radical-polymerizable double bond, and the rest represent organic residues capable of being split off by hydrolysis.

In the above formula, examples of the hydrocarbon group containing a radical-polymerizable double bond are vinyl, allyl, 2-methylallyl, butenyl, cyclohexenyl, cyclopentadienyl, and octadienyl, and examples of the hydrocarbonoxy group containing a radical-polymerizable double bond include allyloxy and 2-methyl allyloxy. Of these, vinyl is most preferred.

Examples of the organic residues capable of being split off by hydrolysis include an alkoxy group such as methoxy, ethoxy or butoxy, an acyloxy group such as formyloxy, acetoxy or propionoxy, and a substituted amino group such as methylamino or ethylamino. Of these, the alkoxy groups are especially preferred.

Thus, vinyltrimethoxysilane and vinyltriethoxysilane are silane compounds which can be conveniently used in the present invention.

The amount of the silane compound is not critical, but can be varied widely according, for example, to the type of polyethylene. Generally, its amount is 0.1 to 30 parts by weight, preferably 0.5 to 10 parts by weight, per 100 parts by weight of the polyethylene.

Advantageously, radical generators used in the reaction beteen the polyethylene and the silane compound are those which decompose upon heating and generate radicals. The radical generator acts as a reaction initiator at the time of chemically bonding the silane compound to the polyethylene. Preferably, these radical generators generally have a half life of 3 minutes or less at the melting temperature of the polyethylene. Examples of such radical generators include organic peroxides such as benzoyl peroxide or lauroyl peroxide, and organic peroxide such as tert-butyl peracetate, tert.-butyl peroxy-2-ethyl hexanoate, or tert.-butylperoxy isobutyrate, tert.-butylperoxy benzoate, dicumyl peroxide, 2,5-dimethyl-2,5-di(tert.-butylperoxy)hexane, 2,5-dimethyl-2,5-di(tert.-butylperoxy) hexyne.

The amount of the radical generator is not limited in particular, but can be varied over a wide range according, for example, to the type of the polyethylene used or the amount of the silane compound. Generally, its suitable amount is 0.01 to 1.5 parts by weight, preferably 0.1 to 1.0 part by weight, per 100 parts by weight of the polyethylene.

The bonding of the silane compound to the polyethylene can be performed easily by the method to be described.

The zinc salt of a higher carboxylic acid acts as a silanol condensation catalyst, and preferably includes zinc salts of aliphatic or alicyclic carboxylic acids containing 8 to 20 carbon atoms, preferably 8 to 17 carbon atoms. Examples of these zinc salts include zinc stearate, zinc octanoate, zinc naphthenate and zinc laurate, and the use of the zinc stearate is especially preferred.

The amount of the zinc salt of higher carboxylic acid can be varied according to the amount of the silane compound bonded to the modified polyethylene. Generally, its amount is 0.01 to 5 parts by weight, preferably 0.1 to 3 parts by weight, per 100 parts by weight of the polyethylene.

According to the present invention, the silanol condensation catalyst may be a mixture of the above higher carboxylic acid zinc salt with a minor amount of a conventional silanol condensation catalyst, for example, organotin compounds such as dibutyltin dilaurate, dibutyltin maleate or dibutyltin diacetate. The amount of the conventional silanol catalyst in the mixture should be minimized, and preferably limited to not more than 5% based on the total weight of the mixed silanol catalyst.

Ordinary heat-decomposable blowing agents used heretofore in the production of polyethylene foams can be used in the present invention. Especially preferred species are those which decompose at a temperature between 170° and 220° C. to generate gas. Specific examples include azodicarbonamide, dinitrosopentamethylene tetramine, benzene-sulfonyl hydrazide and toluenesulfonyl hydrizide. Azodicarbonamide is especially advantageous because of its good thermal stability and optimal decomposition temperature. These blowing agents can be used either alone or in admixture, and the amount of the blowing agent can be varied over a wide range according, for example, to the degree of expansion required of the final foamed shaped article. Usually, its amount is 3 to 30 parts by weight, preferably 10 to 20 parts by weight, per 100 parts by weight of the polyethylene.

If desired, the composition of this invention may further include a chain transfer agent. The chain transfer agent used in this invention has an action of deactivating any portion of the radical generator which remains unreacted at the time of modifying polyethylene in the presence of the radical generator. Examples of suitable chain transfer agents are dodecyl mercaptan, t-butyl mercaptan, n-butyl mercaptan, octyl mercaptan, and α-methylstyrene. The chain transfer agent inhibits the cross-linking reaction of polyethylene and permits the silane compound-bonding reaction to proceed effectively. When such a chain transfer agent is used, its amount is 0.01 to 0.5 part by weight, preferably 0.03 to 0.1 part by weight, per 100 parts by weight of polyethylene.

If desired, the composition of this invention may contain conventional additives such as coloring agents, lubricants, foaming assistants, and deterioration inhibitors in the amounts usually employed in the art.

According to the present invention, the polyethylene composition can be prepared by melt-kneading (a) modified polyethylene obtained by chemically bonding a a silane compound containing at least one unsaturated group to polyethylene in the presence of a radical generator, (b) a zinc salt of a higher carboxylic acid, and (c) a heat-decomposable blowing agent at a temperature below the decomposition temperature of the heat-decomposable blowing agent.

The modified polyethylene can be prepared in advance of melt-kneading, or can be formed in situ at the time of melt-kneading.

When it is to be prepared in advance, polyethylene is mixed (e.g., dry-blended) with the radical generator and the silane compound in the proportions indicated hereinabove, and the mixture is melted and kneaded at a temperature above the melting temperature of the polyethylene, preferably at a temperature higher than 150° C. The melt-kneading can be carried out using an ordinary extruder, calender roll, roll mill, injection molding machine, or the like. The reaction time is generally about 1 to 10 minutes when the reaction system is in the molten state.

The molded polyethylene so formed can be molded into a suitable form such as pellets. Or it can be used in the molten state, and successively kneaded with the higher carboxylic acid zinc salt and the blowing agent to afford the composition of this invention.

The resulting modified polyethylene is blended with the higher carboxylic acid zinc salt and the heat-decomposable blowing agent in the amounts indicated hereinabove, and the mixture is melt-kneaded with or without other optional ingredients at a temperature below the decomposition temperature of the heat-decomposable blowing agent.

As an alternative method, the polyethylene, radical generator, silane compound, higher carboxylic acid zinc salt and blowing agent and other optional ingredients are mixed, and the resulting mixture is melt-kneaded at a temperature below the decomposition temperature of the heat-decomposable blowing agent, preferably at a temperature of 110° C. to 150° C., to afford the composition of this invention. This alternative method simultaneously achieves the bonding of the silane compound to the polyethylene and the melt-kneading of the resulting modified polyethylene, higher carboxylic acid zinc salt and heat-decomposable blowing agent.

Mixing of the ingredients can be performed by conventional means, for example, using a kneader, blender or mixer. The melt-kneading can be carried out using, for example, an extruder, roll, or injection molding machine in which the polyethylene is melted by heat and kneaded with the other ingredients.

The temperature for melt-kneading is above the melting temperature of the modified polyethylene used and below the decomposition temperature of the heat-decomposable blowing agent. Usually, the melt-kneading temperature is preferably about 110° to 150° C. It is sufficient that kneading is carried out for about 1 to 10 minutes at this temperature.

Thus, according to the present invention, a foamable and crosslinkable polyethylene composition having a gel content of not more than 40% by weight, preferably not more than 20% by weight can be obtained.

In the present specification and appended claims, the term "gel content" is defined as the weight percent of an insoluble portion of polyethylene which has been left after immersing the polyethylene in xylene at 110° C. for 48 hours, based on the weight of the polyethylene before immersion.

The foamable and crosslinkable polyethylene composition of this invention can be converted into foamed shaped articles crosslinked to a high degree by subsequent molding and heat-foaming. The gel content of the final foamed shaped article can be raised to at least 50% by weight, usually 60 to 80% by weight. Thus, polyethylene foams having superior thermal stability can be prepared from the composition of this invention.

The polyethylene composition of this invention has very good storage stability, and does not undergo any change at all even when allowed to stand for long periods of time without heat-foaming. Even when it is heated after storage for long periods of time, the state of the cells and the expansion ratio are scarcely different from those with a composition immediately after preparation. Foams of good quality can be prepared from such a polyethylene composition of this invention.

Another advantage of the present invention is that it can be fabricated into any desired shape such as a board, pipe and rod as well as a thin sheet because there is no restriction on the shape or thickness of the shaped structure.

Thus, according to the present invention, there is provided a process for preparing crosslinked polyethylene foams, which comprises melt-kneading (a) modified polyethylene obtained by chemically bonding a silane compound containing at least one unsaturated group in the presence of a radical generator, (b) a zinc salt of a higher carboxylic acid and (c) a heat-decomposable blowing agent at a temperature below the decomposition temperature of the heat-decomposable blowing agent, shaping the kneaded mixture into a desired shape, and heating the shaped article to a temperature above the decomposition temperature of the heat-decomposable blowing agent to expand and crosslink the shaped article.

The polyethylene composition of this invention can be shaped in accordance with this invention into any desired shape such as a sheet, rod, cylinder, board or block. The shaping can be effected by various conventinaal shaping methods such as injection molding, extrusion molding or blow molding.

The resulting shaped article can be expanded and crosslinked by heating it, either immediately after shaping or after storage for long periods of time, to a temperature above the decomposition temperature of the heat-decomposable blowing agent. The heating temperature varies according to the type of the blowing agent used. Usually, however, it is at least 180° C., preferably 200° to 230° C. Generally, the foaming and crosslinking can be completed within 1 to 20 minutes.

As a result of such heating, a small amount of moisture in the shaped article or the moisture in the ambient atmosphere and the zinc salt of higher carboxylic acid act together to hydrolyze the silane compound bonded to polyethylene, and then a condensation reaction occurs to cause the chemical crosslinking of the silane. This in turn results in the crosslinkage of the modified polyethylene to increase its viscoelasticity.

When the zinc salt of higher carboxylic acid is used as a silanol condensation catalyst in accordance with this invention, a crosslinking reaction of the polyethylene composition becomes vigorous only at temperature far higher than the temperature employed in the melt-kneading, and is not particularly active when the decomposition of the heat-decomposable blowing agent does not occur. For this reason, the formation of a main crosslinkage in the modified polyethylene is effected in a step of heating the shaped article to a temperature above the decomposition temperature of the blowing agent.

Substantially at the same time as the proceeding of the crosslinking reaction, the heat-decomposable blowing agent decomposes under heat to generate gas such as nitrogen, and therefore, the shaped article softened by heat is converted to a foamed structure.

The heating of the shaped article can be effected, for example, by radiation from an infrared lamp, application of a hot air, or immersion in a heated liquid bath.

The present invention thus provides a polyethylene foam which is highly crosslinked and has superior thermal stability.

The advantages brought about by the present invention are summarized below.

In the present invention, polyethylene is reacted with the silane compound before or during the melt-kneading operation to form modified polyethylene containing the silane compound in its side chain. When this modified polyethylene is subjected to high temperatures in the presence of the higher carboxylic acid zinc salt, the silane compound is chemically bonded to itself by hydrolysis and condensation caused by the moisture in the ambient atmosphere, which results in the crosslinking of the polyethylene. The crosslinking reaction is promoted in the presence of a product formed by the decomposition of the heat-decomposable blowing agent, especially azodicarbonamide. In the present invention, the polyethylene resin is foamed and crosslinked simultaneously in the step of heating the shaped article to a temperature above the decomposition temperature of the blowing agent. The use of this method can increase the density of crosslinkages in the final product.

For this reason, a polyethylene foam having a high crosslinkage density, that is, having superior thermal stability can be obtained. In contrast, in the conventional method in which a resin is first crosslinked and then foamed, too high a density of crosslinkage makes the foaming of the crosslinked resin difficult, which in turn leads to the difficulty of obtaining foams having superior thermal stability.

Furthermore, in the present invention, the crosslinking of the resin by the higher carboxylic acid zinc salt scarcely occurs at the time of melt-kneading and shaping the resin composition, and therefore, no abrupt rise in viscosity of the resin occurs in these steps. Thus, conventional procedures employed for shaping polyethylene can be applied in these steps. The resin can be fabricated into various shapes such as a rod, cylinder, and spherical container as well as a sheet, and by foaming such a shaped article under heat, a foamed shaped article having a complicated shape conforming to the shape of the above shaped article can be obtained.

Moreover, the present invention does not require the application of ionizing radiation for crosslinking polyethylene, and therefore, can obviate the use of large-scale dangerous equipment required for radiation.

The most characteristic advantage of the present invention is that shaped article of the polyethylene composition need not be heat-foamed immediately, but can be stored for relatively long periods of time before foaming. Even after such a long-term storage, the shaped articles can be converted to foamed products without adverse effects on the expansion ratio or the state of the cells in the heat-foaming step. Thus, even after storing or transporting the resulting shaped structures for long periods of time, foamed articles having satisfactory quality and commercial value can be obtained therefrom.

The polyethylene foams prepared by the present invention can be used in various applications, for example, as a cushioning material, a warmth-retaining material for hot water supply pipes, and a heat insulating or soundproofing material to be embedded in house walls. Since the polyethylene foams in accordance with this invention have especially good thermal stability, they can be suitably used as a heat insulating material for pipes that transport a cooling or heating medium in the form of a cylindrical shaped structure.

The following Examples and Comparative Examples illustrate the present invention specifically.

EXAMPLE 1

100 Parts by weight of polyethylene having an average particle diameter of 20 mesh, a melt index of 4.0, and a density of 0.924 was uniformly mixed with 3 parts by weight of vinyltriethoxysilane, 0.4 part of t-butylperoxy 2-ethylhexanoate, 2 parts by weight of zinc stearate and 15 parts by weight of azodicarbonamide (having a decomposition temperature of 190° C.) in a ribbon blender. The mixture was fed into an extruder, and melt-kneaded at a temperature of 135° C.

When the melt-kneading was performed for about 5 minutes, the vinylethoxysilane was bonded to the polyethylene. The resulting composition was then extruded into a sheet.

EXAMPLE 2

A sheet was prepared by extrusion in the same way as in Example 1 except that the amount of the zinc stearate was changed to 0.4 part by weight.

EXAMPLE 3

A sheet was prepared by extrusion in the same way as in Example 1 except that 0.4 part by weight of zinc octanoate was used instead of the zinc stearate.

EXAMPLE 4

A sheet was prepared by extrusion in the same way as in Example 1 except that 0.4 part by weight of zinc naphthenate was used instead of the zinc stearate.

EXAMPLE 5

A sheet was prepared by extrusion in the same way as in Example 4 except that the amount of the zinc naphthenate was changed to 2.0 parts by weight.

EXAMPLE 6

A sheet was prepared by extrusion in the same way as in Example 1 except that 2.0 parts by weight of zinc laurate was used instead of the zinc stearate.

Comparative Example 1

A sheet was prepared by extrusion in the same way as in Example 1 except that the zinc stearate was not used.

Comparative Example 2

A sheet was prepared by extrusion in the same way as in Example 4 except that 0.4 part by weight of cobalt naphthenate was used instead of the zinc naphthenate.

Comparative Example 3

A sheet was prepared by extrusion in the same way as in Example 1 except that 0.4 part by weight of dibutyltin dilaurate was used instead of 2.0 parts by weight of zinc stearate.

Samples of the sheets prepared in the above examples, either as obtained, after standing for 6 days, or after standing for 14 days, were each allowed to stand in hot air in a chamber held at 220° C. for about 3 minutes to expand them.

The expansion ratio and the state of the cells were determined with regard to all the foams obtained, and the results are shown in Table 1.

Table 1

| Samples | Immediately after preparation State of cells | Immediately after preparation Expansion ratio | After standing for 6 days State of cells | After standing for 6 days Expansion ratio | After standing for 14 days State of cells | After standing for 14 days Expansion ratio |
|---|---|---|---|---|---|---|
| Examples | | | | | | |
| 1 | Good | 33 | Good | 33 | Good | 32 |
| 2 | Good | 32 | Good | 32 | Good | 31 |
| 3 | Good | 31 | Good | 31 | Fair | 31 |
| 4 | Good | 33 | Good | 33 | Good | 30 |
| 5 | Good | 31 | Good | 31 | Good | 32 |
| 6 | Good | 32 | Good | 32 | Good | 32 |
| Comparative Examples | | | | | | |
| 1 | Very poor | 5 | Very poor | 9 | Very poor | 11 |
| 2 | Very poor | 3 | Very poor | 4 | Very poor | 5 |
| 3 | Good | 27 | Poor | 21 | Poor | 8 |

The state of the cells was evaluated on a scale of good, fair, poor, and very poor as follows:
Good: Uniform fine cells occurred all over.
Fair: Irregular cells partly occurred.
Poor: Irregular cells occurred all over.
Very poor: The shape collapsed, and the sample assumed a cast state.

EXAMPLE 7

100 Parts by weight of polyethylene having an average particle size of 30 mesh, a melt index of 4.0 and a density of 0.924 was dry-blended with 2 parts by weight of vinyltriethoxysilane and 0.12 part by weight of dicumyl peroxide, and the blend was fed into an extruder where it was melt-kneaded at 190° C. and pelletized. The resulting pellets of modified polyethylene were pulverized to a size of about 30 mesh.

A composition consisting of 100 parts by weight of the pulverized modified polyethylene, 15 parts by weight of azodicarbonamide and 1 part by weight of zinc stearate was fed into an extruder, melt-kneaded at 134° C. and extruded into a sheet.

EXAMPLE 8

A sheet was prepared by extrusion in the same way as in Example 7 except that 1 part by weight of zinc naphthenate was used instead of the zinc stearate.

Comparative Example 4

A sheet was prepared by extrusion in the same way as in Example 7 except that 1 part by weight of dibutyltin dilaurate was used instead of the zinc stearate.

Comparative Example 5

A sheet was prepared in the same way as in Example 7 except that 1 part of cobalt naphtenate was used instead of the zinc stearate.

Samples of the sheets prepared in Examples 7 and 8 and Comparative Examples 4 and 5, either as obtained, after standing for 7 days, or after standing for 50 days, were each allowed to stand in a hot air heating chamber held at 230° C. for about 3 minutes.

The expansion ratio and the state of the cells were determined with regard to all the foams obtained, and the results are shown in Table 2. The determinations were made by the same methods as described hereinabove.

Table 2

| Samples | Immediately after preparation State of cells | Immediately after preparation Expansion ratio | After standing for 7 days State of cells | After standing for 7 days Expansion ratio | After standing for 50 days State of cells | After standing for 50 days Expansion ratio |
|---|---|---|---|---|---|---|
| Example 7 | Good | 31 | Good | 31 | Good | 31 |
| Example 8 | Good | 32 | Good | 32 | Good | 31 |
| Comparative Example 4 | Good | 26 | Poor | 5 | Poor | 3 |
| Comparative Example 5 | Good | 29 | Poor | 20 | Poor | 15 |

The shaped articles obtained in the above examples were examined for gel content immediately before foaming and after foaming. The results are shown in Table 3 below. The method of measuring the gel content was as defined hereinabove.

Table 3

| Samples | Immediately after preparation Before foaming | Immediately after preparation After foaming | After standing for 6 days Before foaming | After standing for 6 days After foaming | After standing for 14 days Before foaming | After standing for 14 days After foaming |
|---|---|---|---|---|---|---|
| Examples | | | | | | |
| 1 | 0 | 63.0 | 1.5 | 65.0 | 4.0 | 62.3 |
| 2 | 0 | 59.0 | 0 | 58.3 | 1.5 | 59.5 |
| 3 | 0 | 60.5 | 5 | 61.3 | 34.5 | 65.8 |
| 4 | 0 | 55.3 | 0 | 54.6 | 1.5 | 56.3 |
| 5 | 0 | 58.3 | 1.5 | 59.5 | 6.0 | 61.2 |
| 6 | 0 | 60.0 | 1.5 | 58.5 | 1.5 | 58.5 |
| 7 | 0 | 71.2 | 1.5 | 73.5 | 15.5 | 73.0 |
| 8 | 0 | 65.8 | 1.5 | 71.5 | 19.0 | 72.0 |
| Comparative Examples | | | | | | |
| 1 | 0 | 20.3 | 0 | 21.8 | 0 | 25.0 |
| 2 | 0 | 8.5 | 0 | 8.0 | 0 | 9.3 |
| 3 | 0 | 53.0 | 45.0 | 55.0 | 45.8 | 53.8 |
| 4 | 0 | 65.0 | 43.0 | 66.3 | 49.0 | 59.5 |
| 5 | 0 | 68.0 | 11.0 | 72.1 | 41.0 | 69.0 |

What we claim is:
1. A foamable and crosslinkable polyethylene composition conprising

(a) modified polyethylene obtained by chemically bonding a silane compound containing at least one unsaturated group to polyethylene in the presence of a radical generator,
(b) zinc stearate as the silanol condensation catalyst, and
(c) azodicarbonamide as heat-decomposable blowing agent, said ingredients (a), (b) and (c) having been melt-kneaded with one another at a temperature lower than the decomposition temperature of the heat-decomposable blowing agent.

2. The composition of claim 1 which has a gel content of not more than 40% by weight.

3. The composition of claim 1 comprising 100 parts by weight of polyethylene, 0.01 to 1.5 parts by weight of said radical generator, 0.5 to 10 parts by weight of the silane compound, 0.01 to 5 parts by weight of said zinc stearate, and 3 to 30 parts by weight of the heat-decomposable blowing agent.

4. The composition of claim 1 wherein said silane compound is a member selected from the group consisting of vinyltrimethoxysilane and vinyltriethoxysilane.

5. The composition of claim 1 wherein said radical generator has a half life of not more than 3 minutes at a temperature between the melting temperature of the polyethylene and 150° C.

6. The composition of claim 5 wherein said radical generator is a member selected from the group consisting of tert-butylperoxy pivalate, dicumyl peroxide, tert-butylperoxy 2-ethyl hexanoate, tert-butyl peracetate, tert-butylperoxy isobutyrate, benzoyl peroxide and lauroyl peroxide.

7. The composition of claim 1 wherein said heat-decomposable blowing agent has a decomposition temperature of 170° to 220° C.

8. The composition of claim 7 wherein said heat-decomposable blowing agent is a member selected from the group consisting of azodicarbonamide, dinitrosopentamethylene tetramine, benzenesulfonyl hydrazide and toluene-sulfonyl hydrazide.

9. The composition of claim 1 which further includes a chain transfer agent.

10. The composition of claim 9 wherein said chain transfer agent is dodecyl mercaptan.

11. The composition of claim 9 wherein the amount of said chain transfer agent is 0.01 to 0.5 part by weight per 100 parts by weight of the polyethylene.

12. The composition of claim 1 comprising 100 parts by weight of polyethylene, 0.1–1.0 parts by weight of said radical generator, 0.5–10 parts by weight of the silane compound, 0.1–3.0 parts by weight of said zinc stearate, and 10–20 parts by weight of the heat-decomposable blowing agent, said silane compound being a member selected from the group consisting of vinyltrimethoxysilane and vinyltriethoxysilane and said radical generator being a member selected from the group consisting of tert-butylperoxy pivalate, dicumyl peroxide, tert-butylperoxy 2-ethyl hexanoate, tert-butylperacetate, tert-butylperoxy isobutyrate, benzoyl peroxide and lauroyl peroxide, said composition having a gel content of not more than 20% by weight.

13. The composition of claim 11 wherein the amount of said chain transfer agent is 0.03–0.1 parts by weight per 100 parts by weight of the polyethylene.

14. A process for preparing crosslinked polyethylene foams, which comprises melt-kneading (a) modified polyethylene obtained by chemically bonding a silane compound containing at least one unsaturated group to polyethylene in the presence of a radical generator, (b) zinc stearate as the silanol condensation catalyst and (c) azodicarbonamide as a heat-decomposable blowing agent at a temperature below the decomposition temperature of the heat-decomposable blowing agent, shaping the kneaded mixture, and heating the shaped article to a temperature above the decomposition temperature of the heat-decomposable blowing agent to expand and crosslink the shaped article.

15. Crosslinked polyethylene foams prepared by the process of claim 14.

16. The polyethylene foams of claim 15 which are in the form of a sheet, rod, cylinder, board or block.

17. A process for preparing a foamable and crosslinkable polyethylene composition, which comprises melt-kneading (a) modified polyethylene obtained by chemically bonding a silane compound containing at least one unsaturated group to polyethylene in the presence of a radical generator, (b) zinc stearate as the silanol condensation catalyst and (c) azodicarbonamide as heat-decomposable blowing agent at a temperature lower than the decomposition temperature of the heat-decomposable blowing agent.

18. The process of claim 17 wherein said silane compound is a member selected from the group consisting of vinyltrimethoxysilane and vinyltriethoxysilane.

19. The process of claim 17 wherein the amount of the silane compound is 0.5 to 10 parts by weight per 100 parts by weight of the polyethylene.

20. The process of claim 17 wherein said radical generator has a half life of not more than 3 minutes at a temperature between the melting temperature of the polyethylene and 150° C.

21. The process of claim 20 wherein said radical generator is a member selected from the group consisting of tert.-butylperoxy pivalate, dicumyl peroxide, tert.-butyl-peroxy 2-ethyl hexanoate, tert.-butyl peracetate, tert.-butylperoxy isobutyrate, benzoyl peroxide and lauroyl peroxide.

22. The process of claim 17 wherein the amount of the radical generator is 0.01 to 1.5 parts by weight per 100 parts by weight of the polyethylene.

23. The process of claim 17 wherein the amount of said zinc stearate is 0.01 to 5 parts by weight per 100 parts by weight of the polyethylene.

24. The process of claim 17 wherein said heat-decomposable blowing agent has a decomposition temperature of 170° to 220° C.

25. The process of claim 24 wherein said heat-decomposable blowing agent is a member selected from the group consisting of azodicarbonamide, dinitrosopentamethylene tetramine, benzenesulfonyl hydrazide and toluene-sulfonyl hydrazide.

26. The process of claim 17 wherein the amount of the heat-decomposable blowing agent is 3 to 30 parts by weight per 100 parts by weight of the polyethylene.

27. The process of claim 17 wherein a chain transfer agent is further kneaded into the mixture.

28. The process of claim 27 wherein the chain transfer agent is dodecyl mercaptan.

29. The process of claim 27 wherein the amount of the chain transfer agent is 0.01 to 0.05 part by weight per 100 parts by weight of the polyethylene.

30. The process of claim 17 wherein the melt-kneading is carried out by means of an extruder.

31. The process of claim 17 wherein components (a), (b) and (c) are melt-kneaded at a temperature in the range of from 110° to 150° C.

* * * * *